United States Patent
Shigematsu et al.

Patent Number: 5,129,020
Date of Patent: Jul. 7, 1992

[54] WAVELENGTH SELECTIVE OPTICAL FIBER COUPLER

[75] Inventors: Masayuki Shigematsu; Masumi Fukuma, both of Kanagawa, Japan

[73] Assignee: Sumitomo Electric Industries, Ltd., Osaka, Japan

[21] Appl. No.: 578,292

[22] Filed: Sep. 6, 1990

[30] Foreign Application Priority Data

Sep. 6, 1989 [JP] Japan ............... 1-231046

[51] Int. Cl.$^5$ ............................. G02B 6/26
[52] U.S. Cl. ........................ 385/43; 385/27
[58] Field of Search ............ 350/96.15, 96.16, 320; 385/15, 27, 39, 43, 45, 46

[56] References Cited

U.S. PATENT DOCUMENTS

| | | | |
|---|---|---|---|
| 4,490,163 | 12/1984 | Jochem et al. | 350/96.15 X |
| 4,798,436 | 1/1989 | Mortimore | 350/96.15 |
| 4,976,512 | 12/1990 | Safaai-Jazi | 350/96.15 X |
| 5,011,251 | 4/1991 | Miller et al. | 350/96.15 |

FOREIGN PATENT DOCUMENTS

| | | |
|---|---|---|
| 293289 | 5/1988 | European Pat. Off. |
| 942318 | 10/1979 | Fed. Rep. of Germany |
| 60-57303 | 4/1985 | Japan ............... 350/96.15 |
| 63-50805 | 3/1988 | Japan ............... 350/96.15 |
| 038017 | 12/1978 | United Kingdom |

*Primary Examiner*—John D. Lee
*Attorney, Agent, or Firm*—Cushman, Darby & Cushman

[57] ABSTRACT

An optical fiber coupler constructed of single-mode optical fibers having claddings of differing refractive indices. The fibers are fused together and the fused portion is elongated in order to achieve the desired coupling and branching characteristics.

10 Claims, 2 Drawing Sheets

WAVELENGTH SELECTIVE OPTICAL FIBER COUPLER

BACKGROUND OF THE INVENTION

1. Field of the Invention

The present invention relates to an optical fiber coupler, and more particularly to a single-mode optical fiber coupler in which biconical optical fibers are coupled with each other.

2. Description of the Related Art

In a conventional optical fiber coupler, longitudinal coatings of the same kind of optical fibers are partly removed and exposed glass fiber portions of the optical fibers are fused with each other and elongated at the fused portion in order to accomplish optical branching and coupling. Generally, multi-mode optical fibers are used.

However, as seen in the paper by Morishita entitled "Design of Optical Fibers for Wave-length Selective Melt-type Optical Couplers", in Extended Abstracts, The Spring Meeting, 1989, the Institute of Electronics, Information and Communication Engineers of Japan, No. 4- Pages 427, an optical coupler for combining and branching light at a specified wavelength is being studied. In the optical coupler proposed in the above paper, optical fibers to be used are of different core diameters and have a difference in refractive indices between the core and the cladding of each optical fiber so as to combine and branch light of 1.53 μm and 0.83 μm. That is, single-mode optical fibers, having wavelengths which are comparatively far from each other, are used to thereby produce coupling of light in a cladding mode at a long wavelength by utilizing the fact that the optical fibers greatly differ from each other in distribution of light propagated. It is therefore impossible to perform combining and branching of light with wavelength selectivity at wavelengths close to each other.

SUMMARY OF THE INVENTION

It is therefore an object of the present invention to solve the foregoing problems in the prior art. It is another object of the present invention to provide an optical fiber coupler which performs branching and combining of light only at a specified wavelength.

To attain the foregoing objects, the optical fiber coupler according to the present invention is formed by fusing and elongating a plurality of single-mode optical fibers which have claddings different in refractive index from each other.

The optical fiber coupler of the present invention can be constructed so that the outer diameter of an optical fiber having a cladding which has a comparatively high refractive index is made smaller than that of an optical fiber having a cladding which has a comparatively low refractive index.

Further in the present invention, a plurality of single-mode optical fibers having respective claddings which are different in refractive index are fused with each other and then elongated at the fused portion. Thus, a branching characteristic like a band pass filter is shown at a wavelength at which the respective light propagation constants of the different optical fibers agree with each other and the optical fiber coupler exhibits wavelength selectivity.

Other objects, features and characteristics of the present invention, as well as the methods of operation and function of the related elements of the structure, and the combination of parts and economies of manufacture, will become more apparent upon consideration of the following detailed description and the appended claims with reference to the accompanying drawings all of which form a part of this specification.

DESCRIPTION OF THE PREFERRED EMBODIMENT

A preferred embodiment of the present invention will be described with reference to the attached drawings.

In a tapered portion of an optical fiber coupler, a light distribution/combination state results from an evanescent field spreading out of the core of an optical fiber so that the cladding thereof functions as a core, and the air which is an ambient medium functions as a cladding. In such an optical fiber coupler, the branching and combining of light are both performed in the tapered portion. The characteristics of the coupler depend on the condition of fusion between the two optical fibers and the cladding structure such as the shape of the tapered portion, refractive indices of the claddings and cores, and cladding diameter.

Generally, two optical fibers having the same structure are often used. In this case, the propagation constants $\beta$ of the two optical fibers are equal to each other and, therefore, if the coupling length in the tapered portion is selected properly, it is possible to branch all light power propagating in one of the optical fibers into the other optical fiber at a desired wavelength. However, if the two optical fibers are made different in structure, the constants $\beta$ thereof are different from each other, so that the light power which can be branched is limited in proportion to the difference between the constants $\beta$.

Figure 1:
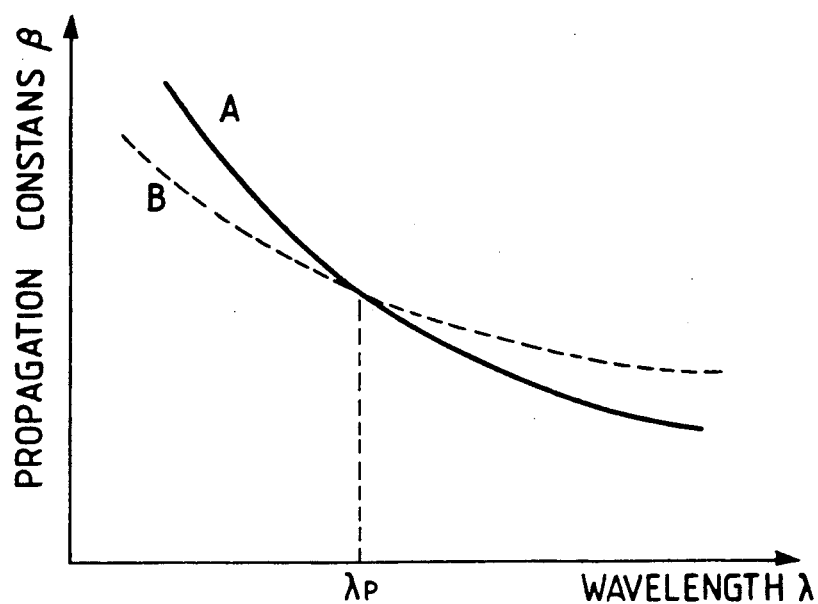
FIG. 1 is a graph of the propagation constant versus wavelength of the fibers to be coupled.

FIG. 1 shows that respective wavelength characteristics of propagation constants $\beta$ of an optical fiber A having a large difference in refractive index between the cladding and core thereof and having small core diameter, and another optical fiber B having a small difference in refractive index between the cladding and core thereof and having a large core diameter. That is, the optical fiber A has a steeper inclination in its characteristic curve and a larger wave-length dependency in its propagation constant. On the other hand, the optical fiber B has a gentle inclination. There should be an accordant point between both the curves. Assuming the wavelength of the accordant point is $\lambda_P$, the difference in propagation constant $\beta$ between the optical fibers becomes large as the wavelength becomes far from the wavelength $\lambda_P$. In the wavelength $\lambda_P$, at the accordant point, if coupling length in the tapered portion is selected appropriately, it is possible to branch all the light power propagating in one of the optical fibers into the other optical fiber. As described above, if the wavelength of the propagating light is far from the wavelength $\lambda_P$, the difference in constant $\beta$ between the two optical fibers becomes large, so that the branching is limited and eventually becomes impossible.

Figure 2:
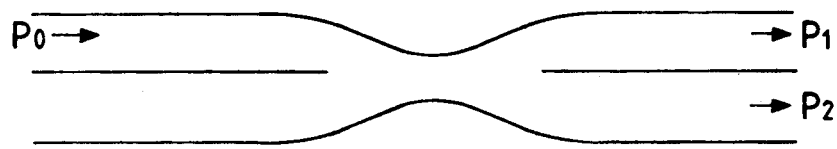
FIG. 2 is a schematic representation of the optical fiber coupler of the preferred embodiment.
Figure 6:
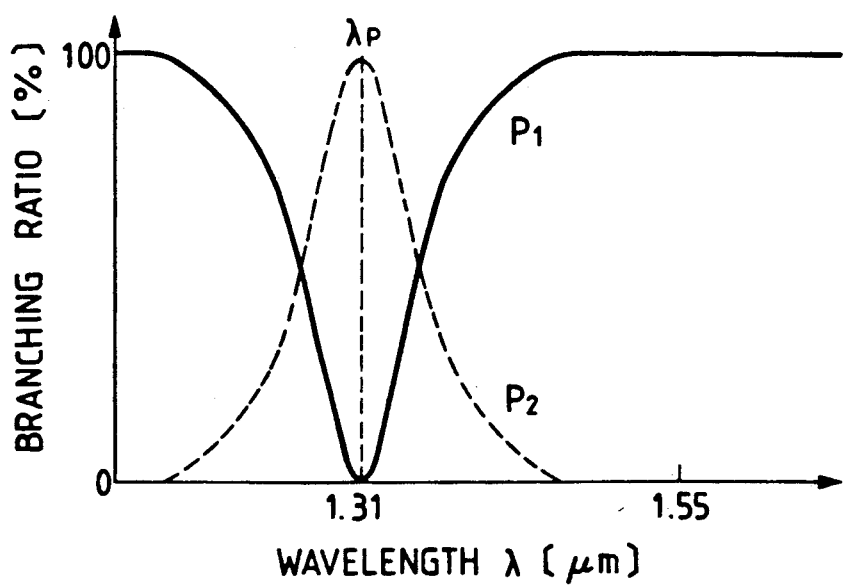
FIG. 6 is a graph of the branching ratios versus wavelength in the preferred embodiment.

As shown in FIG. 2, the input light power $P_0$ is propagated from an input terminal of optical fiber 1 and the output light power $P_1$ is propagated to an output terminal thereof. The branch light power $P_2$ is branched to the branch optical fiber 2 and propagated to an output terminal thereof. In this case, the wavelength dependency of the branching ratio is shown in FIG. 6. With respect to the branch light power $P_2$ in the branch optical fiber 2, it is understood that the output shows a characteristic like a band pass filter at the wavelength of 1.31 $\mu$m.

A specific example of the optical fiber coupler on the basis of the above discussion will be described below.

An optical fiber having a portion of pure silica acting as a cladding and another portion Ge-doped so as to increase its refractive index difference by 0.3% to thereby act as a core was used as the optical fiber 1. Another optical fiber having a portion of pure silica acting as a core and another portion F-doped so as to decrease its refractive index difference by 0.3% to thereby act as a cladding was used as the branch optical fiber 2. The parameters of each of the optical fibers were such that the mode thereof was a single-mode, the mode field diameter was about 10 $\mu$m, the cut-off wavelength was 1.2 $\mu$m, and the outer diameter of the cladding was 125 $\mu$m.

The coating of the optical fiber 1 having the Ge-doped core was partly removed and etched with a fluoric acid so that the outer diameter of the cladding thereof became about 49 $\mu$m, and the optical fiber 1 was combined with the branch optical fiber 2 having the pure silica core and an outer diameter of 125 $\mu$m. The two optical fibers were fused with each other and then elongated at the fused portion using heat generated by an oxy-hydrogen burner. In elongation, a semiconductor laser with a oscillating wavelength of 1.31 $\mu$m was connected to one end of the optical fiber 1 as an input source thereof, and a power meter was connected to the remote end of branch optical fiber 2. The elongation was performed while simultaneously monitoring the branch light power $P_2$ output of the branch optical fiber 2. The elongation was continued until the branch light power $P_2$ at the power meter reached a maximum value. The fused and elongated portion was fixed to a quartz case with an adhesive agent and then taken out, thereby making up a coupler. In the fixation to the quartz case, the adhesive agent was applied to the opposite ends of the fused and elongated portion so as not to allow the adhesive agent to make contact with the tapered portion 3.

Figure 3:
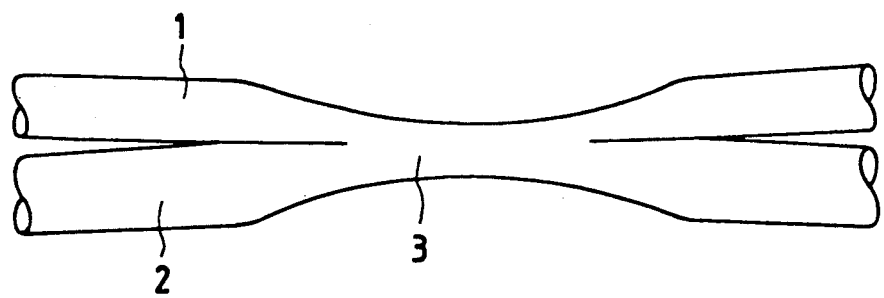
FIG. 3 is a schematic diagram of the optical fiber coupler of the present invention.
Figure 4:
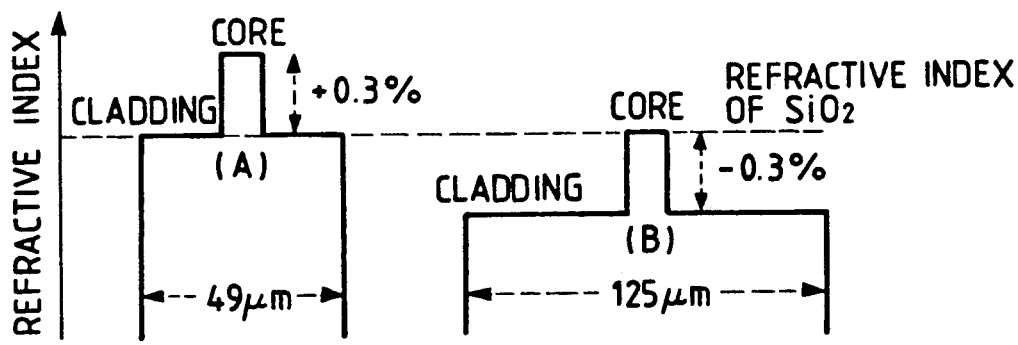
FIG. 4 is a graph of the distribution of refractive index of the optical fibers of the preferred embodiment.
Figure 5:
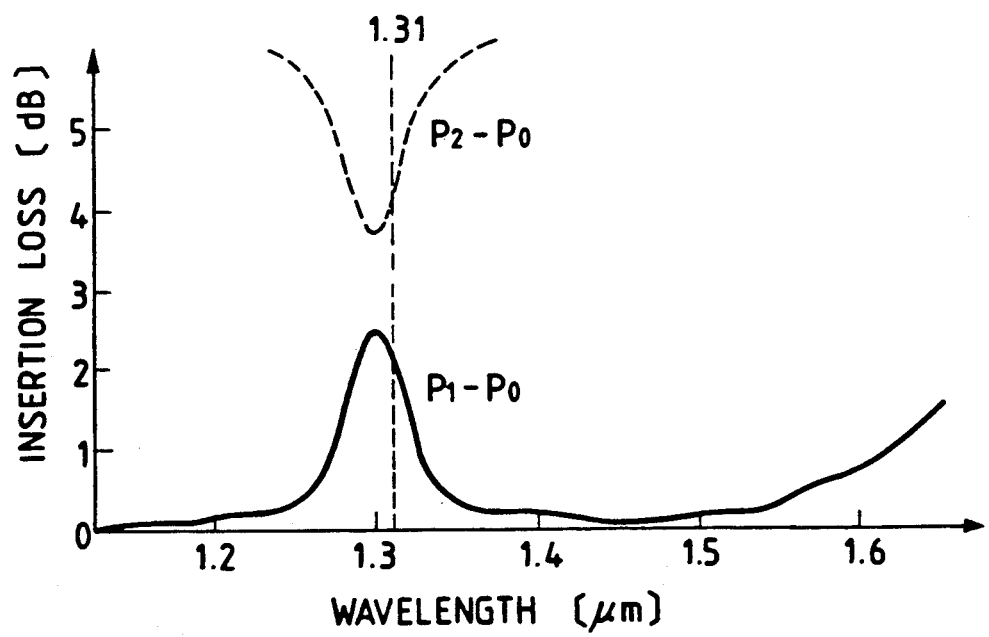
FIG. 5 is a graph of wavelength versus insertion loss of the optical fiber coupler of the preferred embodiment in FIG. 3.

FIG. 3 shows a schematic view of an optical fiber coupler according to the present invention. The length of the tapered portion 3 is about 30 mm, and the minimum diameter of the fused portion is about 20 $\mu$m. FIG. 5 shows the result of measurement of the wavelength dependency of the insertion loss of this optical fiber coupler. In this measurement, as shown in FIG. 2, a monochrometer was connected to one end of the optical fiber 1 having the Ge-doped core, and a power meter was connected to the side of the other end of the optical fiber 1 and branch optical fiber 2. While changing the wavelength of incident light, by varying the monochrometer, the output of the power meter was measured so as to measure the wavelength dependency. Thereafter, the optical fiber 1 at the input terminal was cut off and a power meter is connected to the cut-off portion of the optical fiber 1, and the incident power $P_0$ was measured while changing the wavelength of the incident light in the same manner. Then, the differences (P1-P0) and (P2-P0) were calculated. Thus, an optical fiber coupler showing the same characteristics as that in the above discussion was obtained.

As for the propagation constant $\beta$, in order to make the wavelength dependency different, it is not always necessary to make the cladding diameters different.

As is apparent from the above description, according to the present invention, it is possible to obtain an optical fiber coupler having a wavelength selectivity.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A band pass optical fiber coupler, comprising:
at least first and second single-mode optical fibers for propagating light, each optical fiber having a core and cladding, said claddings having different refractive indices, the optical fibers having a fused portion for combining and branching propagated light only at a single specified wavelength; said band pass optical coupler thereby acting as a band pass filter.

2. An optical fiber coupler as in claim 1, wherein said fused portion is of a predetermined length such that the optical coupler has a predetermined performance characteristic at said single specified wavelength.

3. An optical fiber coupler as in claim 1, wherein a difference in refractive index between said cladding and core of said first optical fiber is larger than a difference in refractive index between said cladding and core of said second optical fiber, and said first optical fiber having a smaller core diameter than said second optical fiber.

4. An optical fiber coupler as in claim 3, wherein a beginning part of said fused portion is tapered for branching all light power propagating into the optical coupler from one of said first and second optical fibers into the other optical fiber.

5. An optical fiber coupler as described in claim 1, wherein a portion of the cladding of said first optical fiber has been removed in such a manner that a diameter of said first optical fiber is made smaller than a diameter of said second optical fiber.

6. An optical fiber coupler as described in claim 5, wherein the core of said first optical fiber is Ge-doped so as to increase its refractive index, and the cladding of said second optical fiber is F-doped so as to decrease its refractive index.

7. An optical fiber coupler as in claim 5, wherein a beginning part of said fused portion is tapered for branching all light power propagating into the optical coupler from one of said first and second optical fibers into the other optical fiber.

8. A band pass optical fiber coupler, comprising:
at least first and second single-mode optical fibers for propagating light, each optical fiber having a core and cladding, a difference in refractive index between said cladding and core of said first optical fiber being larger than a difference in refractive index between said cladding and core of said second optical fiber, said first optical fiber having a smaller core diameter than said second optical fiber, the optical fibers having a fused portion for combining and branching propagated light only at a single specified wavelength; said band pass optical coupler thereby acting as a band pass filter.

9. A method of making a band pass optical fiber coupler, comprising the steps of:

selecting first and second optical fibers, said optical fibers each having a core and a cladding;

Ge-doping the core of said first optical fiber so as to increase a refractive index of said core of said first optical fiber;

F-doping the cladding of said second optical fiber so as to decrease a refractive index of said cladding of said second optical fiber;

removing a portion of said cladding of said first optical fiber so as to reduce a diameter of said first optical fiber;

fusing a portion of said first and second optical fibers together;

elongating said fused portion; and monitoring the characteristics of said optical coupler during elongation so as to achieve a desired performance at only a single specified wavelength; thereby producing a band pass optical fiber coupler which acts as a band pass filter.

10. A method of making an optical fiber coupler as in claim 9, further comprising the step of:

stopping the elongation of the fused portion when light is propagating through said band pass optical coupler only at a single specified wavelength.

* * * * *